United States Patent
Careme

(10) Patent No.: US 9,689,779 B2
(45) Date of Patent: Jun. 27, 2017

(54) METHOD FOR TESTING THE RESISTANCE OF A TIRE TO PRESSURE LOSS

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Christopher Careme, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 38 days.

(21) Appl. No.: 14/906,140

(22) PCT Filed: Jul. 9, 2014

(86) PCT No.: PCT/EP2014/064679
§ 371 (c)(1),
(2) Date: Jan. 19, 2016

(87) PCT Pub. No.: WO2015/010899
PCT Pub. Date: Jan. 29, 2015

(65) Prior Publication Data
US 2016/0187228 A1 Jun. 30, 2016

(30) Foreign Application Priority Data
Jul. 23, 2013 (FR) ..................................... 13 57225

(51) Int. Cl.
*G01M 17/02* (2006.01)
*G01M 3/04* (2006.01)
(Continued)

(52) U.S. Cl.
CPC ......... *G01M 17/02* (2013.01); *B29D 30/0061* (2013.01); *B29D 30/0685* (2013.01); *G01M 3/04* (2013.01)

(58) Field of Classification Search
None
See application file for complete search history.

(56) References Cited

U.S. PATENT DOCUMENTS

| | | | |
|---|---|---|---|
| 2,756,801 A | 7/1956 | Iknayan et al. | |
| 3,903,947 A | 9/1975 | Emerson | 152/347 |

(Continued)

FOREIGN PATENT DOCUMENTS

| | | |
|---|---|---|
| EP | 1 457 308 A1 | 9/2004 |
| EP | 1 944 176 A1 | 7/2008 |

(Continued)

OTHER PUBLICATIONS

International Search Report dated Sep. 29, 2014, issued by WIPO in connection with International Application No. PCT/EP2014/064679.

*Primary Examiner* — Andre Allen
(74) *Attorney, Agent, or Firm* — Fitzpatrick, Cella, Harper & Scinto

(57) ABSTRACT

A method for testing a tire's resistance to pressure loss following a puncture includes inserting a plurality of puncturing objects through a wall of the tire, running the tire with the puncturing objects therein over a given distance with a regulated inflation pressure, stopping the running of the tire, and determining a pressure loss resistance index for each puncture based on an estimate of a leak rate of the puncture. In a first phase of the method, the puncturing objects are made up of pointed smooth-walled objects, such as nails, and the running is performed in such a way that the puncturing objects are not ejected during running. In a second phase of the method, the puncturing objects are made (Continued)

up of objects that are pointed but have walls bearing a screw thread, such as screws, and the running is performed at speeds of below 80 km/h.

20 Claims, 3 Drawing Sheets

(51) Int. Cl.
*B29D 30/00* (2006.01)
*B29D 30/06* (2006.01)

(56) References Cited

U.S. PATENT DOCUMENTS

| | | | |
|---|---|---|---|
| 3,952,787 A | 4/1976 | Okado et al. | 152/347 |
| 4,113,799 A | 9/1978 | Van Ornum et al. | 260/876 B |
| 4,116,895 A | 9/1978 | Kageyama et al. | 260/5 |
| 5,025,662 A * | 6/1991 | Hultberg | G01M 1/225 |
| | | | 73/459 |
| 5,195,370 A * | 3/1993 | Hultberg | G01M 1/225 |
| | | | 73/459 |
| 5,916,931 A | 6/1999 | Adams et al. | 523/166 |
| 6,253,616 B1 * | 7/2001 | Permuy | B60C 17/04 |
| | | | 152/158 |
| 2010/0032070 A1 | 2/2010 | Albert et al. | 152/504 |
| 2011/0219864 A1 * | 9/2011 | Yukawa | B60C 23/065 |
| | | | 73/146.3 |
| 2013/0180324 A1 * | 7/2013 | Sota | B60C 23/062 |
| | | | 73/146 |
| 2015/0007645 A1 * | 1/2015 | Merino Lopez | B29D 30/0061 |
| | | | 73/146.2 |

FOREIGN PATENT DOCUMENTS

| | | |
|---|---|---|
| FR | 2 318 042 A1 | 2/1977 |
| JP | H06-270283 A | 9/1994 |
| WO | WO 99/62998 A1 | 12/1999 |
| WO | WO 2008/080556 A1 | 7/2008 |
| WO | WO 2009/135004 A1 | 11/2009 |

* cited by examiner

METHOD FOR TESTING THE RESISTANCE OF A TIRE TO PRESSURE LOSS

FIELD OF THE INVENTION

The present invention relates to tires, and more particularly to a method for testing resistance to a loss of pressure following a puncturing of a tire.

PRIOR ART

When the wall of a tire is holed by a puncturing object such as a screw or a nail, or is "punctured", tire inflation air may escape through the puncture and the resultant loss in pressure may cause the tire to flatten and the vehicle to stop.

The time that elapses between the act of puncturing and the flattening of the tire is highly variable, and is notably dependent on the size of the puncturing object but also on whether or not running continues with the puncturing object in place in the wall of the tire. This running causes relative movements between the puncturing object and the wall of the tire and this often enlarges the puncture and increases the rate of leakage.

In order to address this problem of punctures, which dates right back to the very start of the use of wheels fitted with pneumatic tires, the usual solution is to stop and replace the affected wheel with a spare wheel.

Other solutions have been conceived of and are available on the market in order to avoid having to use a spare wheel.

Document U.S. Pat. No. 5,916,931 sets out an aerosol container containing an aqueous latex emulsion mixed with various products including fibrous products and a propellant gas. If the tire flattens, this container is designed to be fixed to the tire valve and expel the propellant gas and the sealing/repair emulsion into the internal cavity of the tire. The tire is then reinflated, at least partially, the emulsion plugs the puncture and running can be resumed, at a low speed initially in order to distribute the emulsion properly over the entire internal surface of the tire, and then normally.

There are also repair kits, which are offered by certain motor manufacturers in place of a spare wheel. The benefit of that is that it reduces the weight of the car and therefore the fuel consumption thereof and saves space under the floor of the luggage compartment.

The puncture kit is made up of a compressor, a cylinder of sealant, an electric lead and an air hose. Once the cylinder of sealant has been fixed to the compressor, the air hose has been screwed to the cylinder and to the valve of the tire and the electric lead has been plugged into the vehicle cigarette lighter, all that remains to be done is to switch the compressor to "on", leaving the engine running in order not to drain the battery.

The sealant empties into the tire in around 30 seconds during which the pressure in the air hose will rise to around 6 bar. Next, the air will inflate the tire and the theoretical inflation pressure will be reached within 10 minutes. Once the pressure is reached, all that then remains is for the compressor to be switched off and the kit removed.

Once the tire has been reinflated, it is necessary to get quickly back behind the wheel and drive 10 km and check the pressure of the tire using the compressor and the air hose in order to bring it to the required level.

Once the punctured tire has been repaired, a speed of 80 km/h should not be exceeded and the tire should be checked or changed soon after. The tire repair kit is only a temporary repair.

Tire manufacturers have also proposed tires provided on their interior wall or within their structure with a layer of elastic, viscous or pasty products referred to as "self-sealing products", that are able to seal punctures. Document WO 2008/080556 A1 discloses one example of such a tire. These tires are not puncture-proof as such but the punctures are normally closed or sealed by the self-sealing product.

The manufacturers of these various solutions all offer remarkable puncture-sealing results using their products, notably if a puncture is followed by immediate removal of the puncturing object. However, no test method corresponding to usual driving conditions exists and so it is very difficult to determine how effective these various solutions actually are and compare them against one another.

BRIEF DESCRIPTION OF THE INVENTION

The subject of the invention is a method for testing the resistance of a tire to a loss in pressure following a puncture, characterized in that it comprises the following steps:
creating a plurality of punctures in the wall of the tire by inserting a plurality of puncturing objects through the wall;
running the tire with the puncturing objects in it over a given distance with a regulated inflation pressure;
stopping running; and
determining, for each puncture, a pressure loss resistance index based on an estimate of the leak rate of the puncture;
and in that:
in a first phase, the plurality of puncturing objects is made up of pointed smooth-walled objects such as nails and running is performed in such a way that the objects are not ejected during running; and
in a second phase, the plurality of puncturing objects is made up of objects that are pointed but have walls bearing a screw thread, such as screws, and running is performed at speeds of below 80 km/h.

This test method has the advantage of being highly selective because of the running performed in the presence of a plurality of puncturing objects. This running causes relative movements between the puncturing objects and the wall of the tire which relative movements may enlarge the punctures and make them far more difficult to seal or keep sealed. The use of a plurality of puncturing objects of varying types and diameters coupled with running at a regulated pressure means that numerous puncture resistance results can be obtained using a single tire, thus limiting the number of tests required. It is advantageous to regulate the inflation pressure of the tested tire in order to compensate for any leaks that may occur during running, particularly if a puncturing object is ejected. That means that the performance of the punctures associated with the other puncturing objects present in the tire can be studied.

This test method is particularly useful for tires comprising a self-sealing product, for example a layer of self-sealing product arranged on the interior wall thereof, or in the wall thereof.

When the tire does not comprise any self-sealing product, upon stopping running and prior to determining the pressure loss resistance index, a sealing product is placed in the internal cavity of the tire.

This test method therefore allows all the replacement solutions that take the place of a spare wheel in the event of a puncture, and notably tire inflators and repair kits, to be tested under realistic conditions. Of course, this introduction of a sealant into the internal cavity of the tire needs to be performed according to the proper procedure specific to each sealing solution tested.

The test method according to one subject of the invention comprises several phases, each phase using different types of puncturing objects and test conditions adapted to suit.

This is because the applicant companies have found that the performance of a self-sealing product or of a layer of self-sealing product may differ according to the shape of the puncturing objects.

It has been found that when the puncturing objects are sharp, smooth-walled objects such as nails, performance at low speed is constant but reduces progressively beyond a certain speed threshold. The first phase of the test method using such nails as puncturing objects has the advantage of testing the puncture-resistance performance at a speed that is high enough for the test to be selective but not so high as to cause an appreciable ejection of the puncturing objects. For preference, the running speed $V_1$ for this first phase is fixed and greater than 80 km/h, very preferably between 90 and 120 km/h.

Below 80 km/h the test method does not allow similar self-sealing product solutions to be classified and beyond 120 km/h the proportion of nails that are ejected becomes too great.

Specifically, it has been found that the performance of a self-sealing product or a self-sealing layer after the puncturing object has been ejected, particularly in the case of nails, is very random. It is therefore not possible to have a test that is selective and repeatable if numerous of the puncturing objects have been ejected.

The test method comprises a second phase in which the plurality of puncturing objects is made up of objects that are sharp with walls comprising a thread, such as screws.

It is found that the self-sealing performance in the presence of such puncturing objects is not as good when stationary and at low speed but changes for the better as a function of the speed at which it is run.

In the presence of such puncturing objects of the screw type, it is found that preheating the tire to between 50 and 60 degrees Celsius at the moment of insertion of these objects improves the performance before running and also after running. Advantageously, such preheating may form part of this second phase insofar as this is closer to the conditions of use: most punctures occur when the tire is running and therefore hot.

The running in the second phase is preferably performed at a speed of less than 80 km/h. This makes it possible to make a clear differentiation between how various self-sealing solutions behave in the presence of punctures in the crown of the tire caused by screws. Advantageously, the speed of running $V_2$ is between 50 and 75 km/h.

Advantageously, this second phase of the test method is supplemented by performing a test with puncturing objects of the screw type and at a higher fixed speed $V_{2-2}$, greater than 80 km/h.

That makes it possible, for each solution, to assess the gradient of improvement in self-sealing performance as a function of speed.

The test method thus described makes it possible to assess the pressure loss resistance of a self-sealing solution in two complementary cases of puncturing objects. It is found that the classifications of the solutions are independent of one another in these two cases.

Advantageously, the test method further comprises a third phase with the following steps:
 creating a plurality of punctures in the wall of the said tire by inserting a plurality of puncturing objects through the said wall;
 extracting the plurality of puncturing objects from the wall of the said tire;
 running the tire after the puncturing objects have been extracted at a speed $V_3$ greater than 120 km/h over a given distance with a regulated inflation pressure;
 stopping running; and
 determining, for each puncture, a pressure loss resistance index based on an estimate of the leak rate of the said puncture.

For preference, the speed $V_3$ is fixed and less than 180 km/h.

This third phase has the advantage of characterizing the performance of a self-sealing solution in a third scenario independent of the first two already mentioned. This involves testing the high-speed mechanical resistance of the plugs of self-sealing product that fill the punctures after the puncturing object has been extracted. The results of this third phase complement those of the first two.

The running distance for each of the phases of the test method is advantageously greater than 200 km and very advantageously greater than 500 km.

Of course, depending on the circumstances and the number of puncturing objects used for each phase, the same tire could be used for all three phases of the test method or several tires could be used, each one equipped with the same self-sealing solution, in order to test this self-sealing solution.

Advantageously, the test method comprises an additional step of calculating a mean pressure loss resistance index ($I_{M1}$, $I_{M2}$, $I_{M3}$) for all the punctures.

It is also advantageous to determine each index by combining the scores for the puncturing objects and weighting these scores using a curve that indicates the frequency at which the objects appear within the customer base.

It is, for example, possible to refer to the curve showing the distribution of nail and/or screw diameters found in a given country. That makes it possible to operate at conditions closer to the actual conditions of use in a given country.

The three indices thus obtained, $I_{M1}$, $I_{M2}$, $I_{M3}$ allow the resistance of a tire to pressure loss following a puncture to be characterized very selectively whether or not this tire is equipped from the outset with a self-sealing product.

The tire may be run on a rolling road.

For preference, the tire is inflated before the puncturing objects are inserted through the wall thereof. That makes it easier to insert the puncturing objects.

During running, the tire inflation pressure is preferably regulated and very preferably regulated to a pressure comprised between 1.8 and 5 bar according to the type of tire tested.

Advantageously, the plurality of puncturing objects comprises screws and nails of varying diameters and/or varying lengths.

The diameter of the puncturing objects is preferably 3 to 5 mm.

Advantageously, the plurality of puncturing objects comprises 10 to 50 puncturing objects, preferably between 20 and 40 objects.

The puncturing objects can be inserted into the crown of the tire from the exterior surface of the grooves of the tread pattern of the tire.

They may also be inserted into the tread blocks of the tread pattern of the tire.

Advantageously, a surfactant is used to visualize and qualitatively assess the leak rate of each puncture.

The following scoring scheme may be used to assess the leak rate of a puncture:

100: no bubble visible, no leak;
80: nanoleak, very small bubbles of diameter smaller than 0.1 mm, visible only with a magnifying glass;
60: microleak, small bubbles visible to the naked eye, of diameters comprised between 0.1 and 1 mm;
0: leak, growing bubbles of diameter greater than 1 mm, or no bubble at all because the air flow rate is too great.

DESCRIPTION OF THE FIGURES

The attached figures illustrate various aspects of the method for testing the resistance of a tire to a loss in pressure in the case of a tire comprising a self-sealing layer on its interior wall.

DETAILED DESCRIPTION OF THE INVENTION

A Michelin Energy Saver tire 1 of size 205/55 R 16 provided with a layer of self-sealing product as set out in the aforementioned application WO 2008/080556 A1 is tested.

Figure 8:
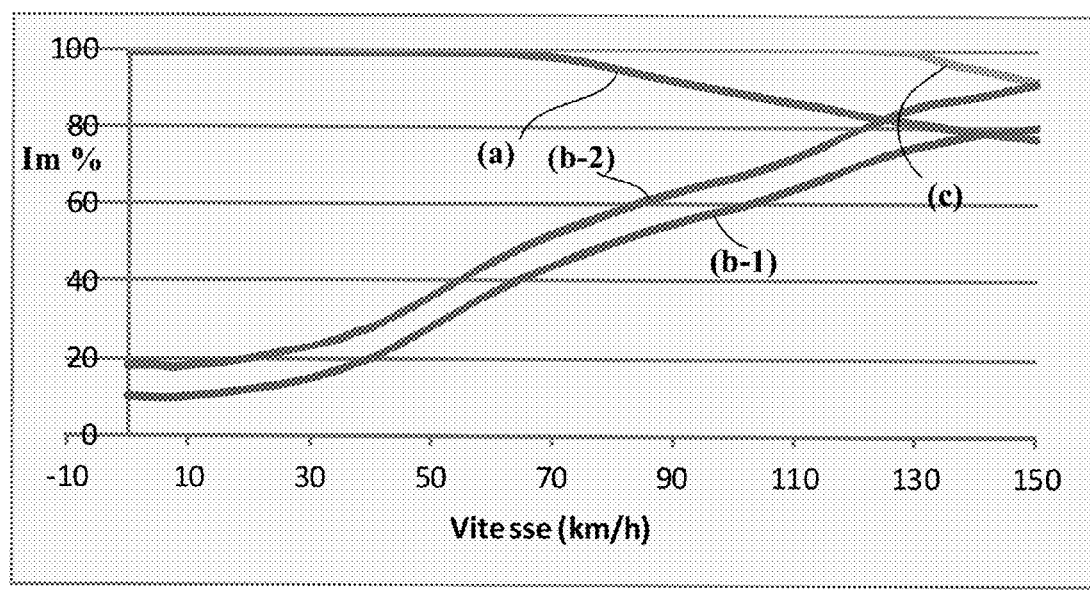
FIG. 8 schematically shows the influence of running speed on the performance of a self-sealing solution.

FIG. 8 very schematically shows the influence of running speed on the performance of a given self-sealing solution. The running conditions are those of the various phases of the test method according to one subject of the invention.

Graph (a) shows the case of puncturing objects of the nail type, sharp objects the lateral wall of which is smooth (phase 1). Performance is excellent at low running speed but then decreases progressively with speed upwards of a speed of the order of 70 km/h.

Graph (b-1) illustrates the case of puncturing objects of the screw type, sharp objects the lateral wall of which has a screw thread (phase 2). The screws are inserted into the crown of the tire in the cold state, i.e. at ambient temperature of the order of 20 degrees Celsius. Performance when stationary and at low speed is not good, but then improves progressively with speed.

Graph (b-2) illustrates the case of puncturing objects of the screw type, when the puncturing objects of the screw type are inserted hot, i.e. when the tire has been brought up to a crown temperature of the order of 50 to 60 degrees Celsius. An improvement in pressure loss resistance performance is observed, which improvement is appreciable over the entire speed range tested.

Finally, graph (c) illustrates the performance obtained during running performed after the puncturing objects have been extracted immediately after they have been inserted into the crown of the tire (phase 3). Once again, low speed performance is excellent and it is only beyond a high speed of the order of 130 km/h that mean performance may begin to decrease. That characterizes the high-temperature mechanical strength of the plugs of self-sealing product.

Figure 1:
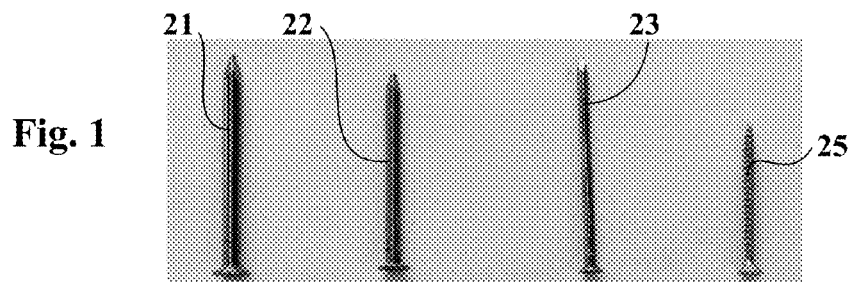
FIG. 1 shows a number of puncturing objects.

FIG. 1 shows a few examples of puncturing objects commonly used for the test method. These are nails 21 of diameter 3 mm, nails 22 of diameter 4 mm and nails 23 of diameter 5 mm as well as screws 25 of diameter 3.5 mm, of length 30 or 40 mm.

Figure 2:
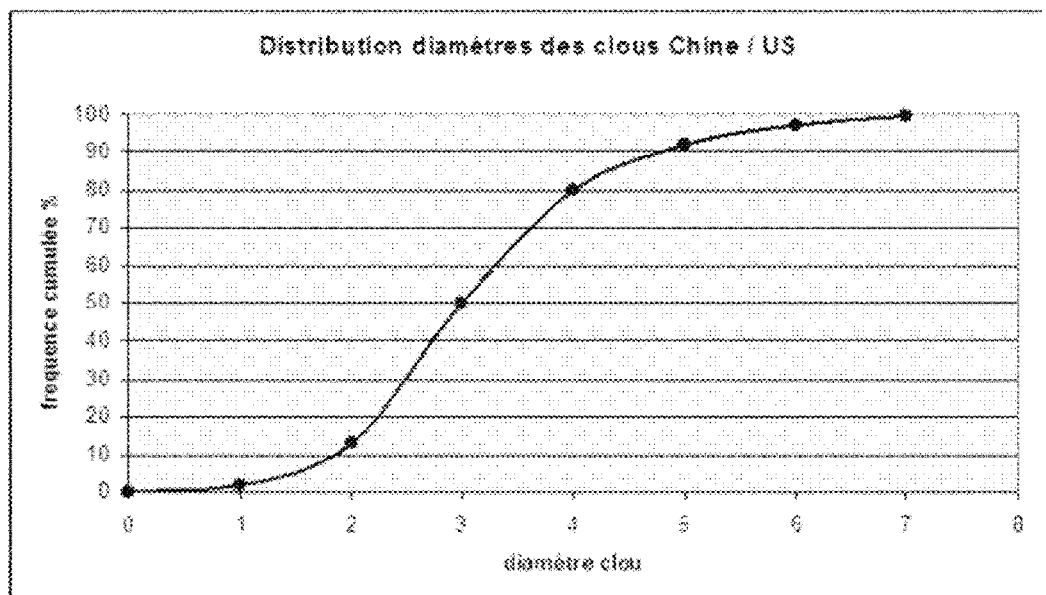
FIG. 2 is a curve, as a cumulative frequency, of the distribution of nail diameters observed in China and in the United States.

The diameters of these puncturing objects are entirely realistic with respect to the puncturing objects encountered under actual running conditions. FIG. 2 shows, as a cumulative frequency, the distribution of the nails found on roads in China and in the United States. It may be observed that nails with diameters less than or equal to 5 mm together account for more than 90% of the objects encountered.

Once the tire 1 has been mounted on an appropriate wheel and inflated to 2.5 bar, the tire and the wheel are rigidly attached to a rotary hub, not depicted, and a plurality of puncturing objects is inserted through the crown 3 of the tire 1.

Figure 3:
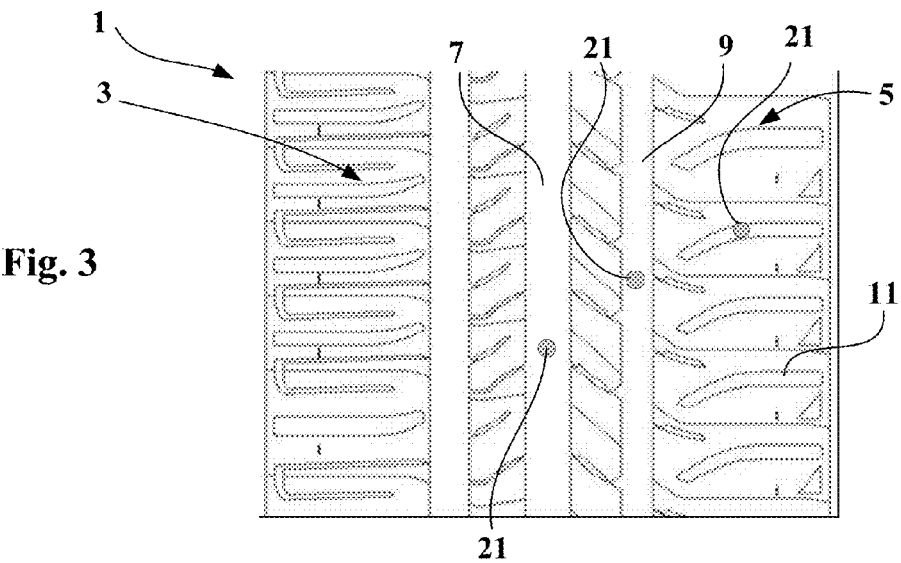
FIG. 3 is a partial view from above of the crown of a tire comprising three punctures.

FIG. 3 shows a partial view from above of the crown 3 of a tire 1. The tread pattern of this tire comprises three longitudinal grooves, inboard, central 7 and outboard 9, and an outboard shoulder 5 with a set of transverse grooves or voids 11. Inboard or outboard refers to the side of the tire intended to be mounted towards the inside of the vehicle or towards the outside of the vehicle, the tread pattern of this tire being asymmetric. FIG. 3 shows three punctures by nails 21 arranged in the central longitudinal groove (CG) 7, the outboard longitudinal groove (OG) 9 and the lateral groove (TV) 11 of the outboard shoulder 5.

For the first phase of the test method or "nails protocol" twelve nails of diameter 3 mm and of length between 45 and 60 mm, six nails of diameter 4 mm and of similar length and six nails of diameter 5 mm and of similar length have been inserted into the entire crown.

For the second phase of the test method or "screws protocol", having raised the crown of the tire to a temperature of the order of 50 to 60 degrees Celsius, twelve screws of diameter 3.5 mm and length 30 mm and twelve screws of diameter 3.5 mm and length 40 mm were inserted over the entire crown. The puncturing objects are evenly distributed about the circumference of the crown.

The inflated tire and wheel assembly is then fixed to the hub of a roller with a developed length of five to six meters.

The running conditions are as follows: the inflation pressure is regulated, for example to 2.5 bar, the applied load is of the order of 70% of the load rating of the tire, and the temperature in the rolling road chamber is regulated to around 20° C., running being in a straight line without torque and with no applied cornering or camber.

The speed conditions are dependent on the protocol:
for the nails protocol, running is six hours at $V_1$=100 km/h; at this speed, practically no nail ejection is observed;
for the screw protocol, a $1^{st}$ running is performed for six hours at a speed $V_2$=70 km/h; then, once the results of the first running have been analyzed, a second running is performed for six hours at a speed $V_{2-2}$=130 km/h;
for the third phase or "plugs protocol" running is for six hours at 150 km/h.

It is possible that the largest nails will be ejected during running. The analytical conditions of the test (nail that is new, not rusty, standing up straight) encourage ejection to occur. When that happens, the ejected nail is not taken into consideration when calculating the final scores. Screws are not expelled during running either as the screw thread increases the force necessary for extracting them.

After running, a cooling phase lasting a minimum of two hours is observed.

The results are analyzed half-crown by half-crown.

The result of the test is a qualitative observation of the leaks of each puncture, prior to extraction, after extraction and approximately 10 min after extraction.

The leaks are assessed using a surfactant, for example an aerosol canister of the "1000 bubbles" make. The product is sprayed onto the puncture and the assessor notes the presence, size and number of bubbles using a magnifying glass under bright lighting.

Figure 4:
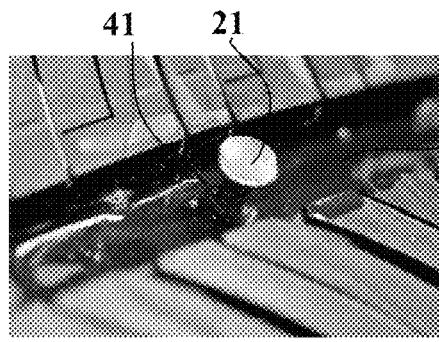
FIG. 4 illustrates the case of a puncture with a zero leak rate.
Figure 5A:
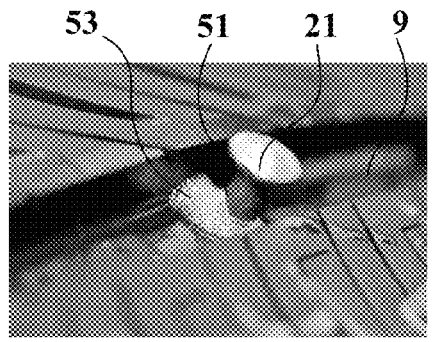
FIGS. 5(a) and (b) illustrate the case of a puncture with a very low leak rate.
Figure 5B:
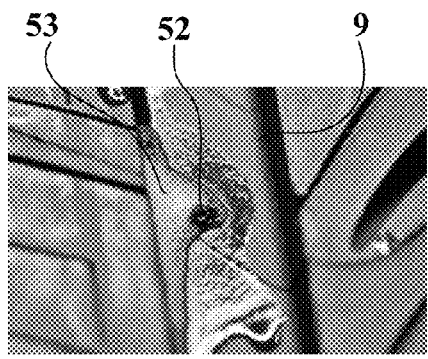

FIGS. 4 to 7 illustrate the various cases observed with the puncturing objects in place (FIGS. 4, 5(*a*), 6 and 7(*a*)) and after they have been extracted or ejected (FIGS. 5(*b*), 7(*b*)).

FIG. 4 shows a nail 21 passing through a puncture 41 positioned in the longitudinal groove 9 of the tire. No bubble can be seen; there is no leak; the puncture is scored 10 or 100%

FIG. 5(*a*) shows a puncturing object 21 passing through a puncture 51 located in the longitudinal groove 9 of the tire. The application of the surfactant reveals a great many very very small bubbles 51, visible only under a magnifying glass and of a diameter less than 0.1 mm. This is a very small leak scored 8 or 80%.

FIG. 5(*b*) shows a puncture 52 made by a puncturing object which has been expelled or extracted. The puncture 52 is likewise situated in the outboard longitudinal to groove 9 of the tire. The application of surfactant also reveals a great many very very small bubbles 51, visible under a magnifying glass and of a diameter smaller than 0.1 mm. This is given the same score 8 or 80%.

Figure 6:
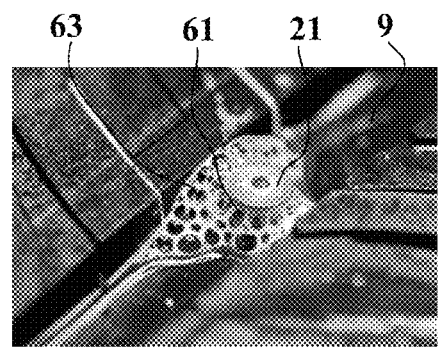
FIG. 6 illustrates the cases of a puncture with a low leak rate.

FIG. 6 shows a puncturing object 21 passing through a puncture 61 located in the outboard longitudinal groove 9 of the tire. There, the application of the surfactant reveals a collection of small bubbles 63 of a diameter roughly comprised between 0.1 mm and 1 mm. This is a small leak scored 6 or 60%.

Figure 7A:
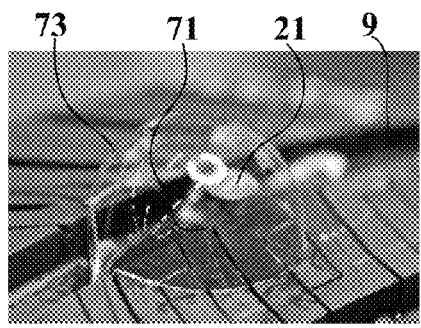
FIGS. 7(a) and (b) illustrate the cases of a puncture with a rapid leak.
Figure 7B:
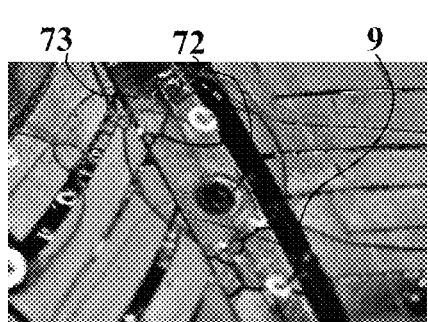

FIG. 7(*a*) shows a puncturing object 21 passing through a puncture 71 still located in a longitudinal groove of the tire. The application of the surfactant reveals a single large bubble 73 of diameter greater than 1 mm. This is a leak that scores 0 or 0%.

FIG. 7(*b*) shows, in the longitudinal groove of the tire, a puncture 72 the puncturing object for which has been expelled during running or extracted after stopping. Likewise, just one single large bubble 73 of a diameter greater than 1 mm can be seen. This is a leak that scores 0 or 0%.

The following tables show the results of the nails protocol.

TABLE 1

Nails protocol - scores before running

| | Scores before running | | | | | | | | | | | |
|---|---|---|---|---|---|---|---|---|---|---|---|---|
| | Ø3 mm | | | Ø4 mm | | | Ø5 mm | | | Ø3 mm | | |
| Positions | CG | OG | CT | CG | OG | CT | CG | OG | CT | CG | OG | CT |
| Scores | 10 | 10 | 10 | 10 | 10 | 10 | 10 | 10 | 10 | 10 | 10 | 10 | where:
- OG: nail placed in the outboard groove 9;
- CG: nail placed in the central groove 7; and
- CT: nail placed in a transverse void 11.

No leak is observed for the 12 nails incorporated into half of the crown block of the tire 1, performance is 100%.

TABLE 2

Nails protocol - scores after running

| | Nail in place after running | | | | | | | | | | | |
|---|---|---|---|---|---|---|---|---|---|---|---|---|
| | Ø3 mm | | | Ø4 mm | | | Ø5 mm | | | Ø3 mm | | |
| Positions | CG | OG | CT | CG | OG | CT | CG | OG | CT | CG | OG | CT |
| Scores | 10 | 10 | 10 | 10 | 8 | 6 | 10 | 6 | 6 | 10 | 10 | 8 |

After six hours of running at 100 km/h it is found that none of the twelve nails has been ejected. A very small leak is observed for a nail of diameter 3 mm; a small leak scored 6 and a very small leak scored 8 for nails of diameter 4 mm and two small leaks scored 6 for nails of diameter 5 mm.

The performance thus decreases from 97% for nails of diameter 3 mm to 80% for those of diameter 4 mm and 73% for those of diameter 5 mm.

TABLE 3

Nail protocol - scores after extraction

| | Check after running and extraction of nails | | | | | | | | | | | |
|---|---|---|---|---|---|---|---|---|---|---|---|---|
| | Ø3 mm | | | Ø4 mm | | | Ø5 mm | | | Ø3 mm | | |
| Positions | CG | OG | CT | CG | OG | CT | CG | OG | CT | CG | OG | CT |
| Scores at T0 | 10 | 8 | 8 | 8 | 8 | 8 | 8 | 8 | 8 | 10 | 8 | 10 |
| Scores at T10 | 10 | 8 | 8 | 10 | 8 | 8 | 10 | 8 | 10 | 10 | 8 | 10 |

Table 3 above shows the results observed after the nails have been pulled out. Two phases of scoring are carried out: immediately after pulling out (T0) and ten minutes later (T10). It is found that certain scores may change between T0 and T10. The results are good between 80 and 90%.

An overall "nails in place" score can be calculated from the results of table 2 by weighting the various nail diameters using a curve that indicates the frequency at which the nails appear within the customer base. Likewise an overall "nails pulled out" score can be calculated from the results of table 3.

The following tables show the results of the screws test.

TABLE 4

Screws protocol - scores before running

| | Length 40 | | | Length 40 | | | Length 40 | | | Length 40 | | |
|---|---|---|---|---|---|---|---|---|---|---|---|---|
| Positions | CG | OG | TV | CG | OG | TV | CG | OG | TV | CG | OG | TV |
| Tire hot | 0 | 0 | 6 | 6 | 0 | 0 | 0 | 0 | 0 | 6 | 6 | 6 |
| Tire cold | 0 | 0 | 6 | 6 | 0 | 0 | 0 | 0 | 6 | 6 | 6 | 6 |

Table 4 above shows the results observed when inserting screws 40 mm long in the crown of the tire. Twelve screws were inserted into a ½ tire. Scores when hot are taken (the "tire hot" row) then after the tire has cooled (the "tire cold" row). Note that in this example the insertion of the screws systematically causes leaks of greater or lesser magnitude to appear. The performance index is 25% with the tire hot and 30% after the tire has cooled. All or some of these leaks disappear during running.

TABLE 5

Screws protocol - scores after running at 70 km/h

| | Scores after running | | | | | | | | | | | |
|---|---|---|---|---|---|---|---|---|---|---|---|---|
| | Length 40 | | | Length 40 | | | Length 40 | | | Length 40 | | |
| Positions | CG | OG | TV | CG | OG | TV | CG | OG | TV | CG | OG | TV |
| Running at 70 km/h | 0 | 0 | 6 | 8 | 0 | 0 | 0 | 0 | 0 | 10 | 8 | 6 |

Table 5 shows the results obtained at the end of the first running of the screws protocol at 70 km/h. The index obtained is very close to the previous two before running: 32%.

TABLE 6

Screws protocol - scores after running at 130 km/h

| | Scores after running | | | | | | | | | | | |
|---|---|---|---|---|---|---|---|---|---|---|---|---|
| | Length 40 | | | Length 40 | | | Length 40 | | | Length 40 | | |
| Positions | CG | OG | TV | CG | OG | TV | CG | OG | TV | CG | OG | TV |
| Running 130 | 8 | 0 | 8 | 10 | 0 | 10 | 10 | 0 | 6 | 10 | 0 | 10 |
| Pulled out T0 | 8 | 8 | 8 | 8 | 6 | 8 | 6 | 6 | 10 | 0 | 8 | 10 |
| Pulled out T10 | 8 | 10 | 10 | 8 | 10 | 10 | 6 | 8 | 10 | 10 | 8 | 10 |

Table 6 above shows the results observed at the end of the second running at 130 km/h. It will be noted in this case that the scores have improved appreciably between the 1$^{st}$ and the second running with the screws in place: $I_M$=60%.

Table 6 also shows the results observed after the screws have been pulled out. As with the nails, two phases of scoring are performed: immediately after pulling out (T0) and 10 minutes later (T10). The scores obtained after the screws have been pulled out are 72% at T0 and 90% at T10.

The following tables show the results of the plug tests

TABLE 7

Plugs protocol - scores after insertion and pulling-out

| | Scores before running | | | | | | | | | | | |
|---|---|---|---|---|---|---|---|---|---|---|---|---|
| Positions | Ø 5 mm | | | Ø 5 mm | | | Ø 5 mm | | | Ø 4 mm | | |
| Filled? | CG | OG | TV | CG | OG | TV | CG | OG | TV | CG | OG | TV |
| After pull-out | 10 | 10 | 10 | 10 | 10 | 10 | 10 | 10 | 10 | 10 | 10 | 10 |

Table 7 above shows the results observed after the phases of inserting and pulling out the nails. If a score is 0, the hole is filled and a new insertion is performed a little further along the crown of the tire.

TABLE 8

Plugs protocol - scores after running at 150 km/h

| | Scores after running | | | | | | | | | | | |
|---|---|---|---|---|---|---|---|---|---|---|---|---|
| | Ø 5 mm | | | Ø 5 mm | | | Ø 5 mm | | | Ø 4 mm | | |
| Positions | CG | OG | TV | CG | OG | TV | CG | OG | TV | CG | OG | TV |
| T0 | 10 | 10 | 10 | 10 | 10 | 0 | 10 | 10 | 10 | 10 | 10 | 10 |
| T10 | 10 | 10 | 10 | 10 | 10 | 0 | 10 | 10 | 10 | 10 | 10 | 10 |

It is mainly the diameter 5 mm nails that are used: the desire is to detect any weaknesses of the product tested in the most unfavorable case.

Table 8 above shows the results observed at the end of running. Two phases of scoring are performed: immediately after pulling out (T0) and 10 minutes later (T10). Note that most of the scores are 10.

The test described was for a tire equipped as original equipment with a layer of self-sealing product. As has already been indicated, the test described also allows the other solutions such as tire inflators and repair kits to be tested.

Tests were conducted with these other solutions. It is found that the sealing performance is practically 100% for all the solutions in the event of a puncture with instant removal of the puncturing object. By contrast, if the tire is run with the puncturing object in place, after as little as 200 to 300 km of running, the performance of tire inflators becomes zero, the product escaping through the punctures. As far as repair kits are concerned, these perform better but the performance drops off very greatly also with the length of running performed with the puncturing objects still in place.

The test thus described has the advantage of being highly selective and of being based on an analysis of the leak rates of each puncture rather than on a loss in pressure, and this allows numerous results to be obtained with one single tire.

The invention claimed is:

1. A method for testing a resistance of a tire to a loss in pressure following a puncture, the method comprising performing a first phase testing and a second phase testing, each of the first phase testing and the second phase testing including:
   creating a plurality of punctures in a wall of the tire by inserting a plurality of puncturing objects through the wall,
   running the tire with the puncturing objects in the tire over a given distance with a regulated inflation pressure,
   stopping the running of the tire, and
   determining, for each puncture, a pressure loss resistance index based on an estimate of a leak rate of the puncture,
   wherein, in the first phase testing, the puncturing objects are made up of pointed objects having smooth walls, and the running of the tire is performed in such a way that the puncturing objects are not ejected during the running, and
   wherein, in the second phase testing, the puncturing objects are made up of pointed objects having screw-threaded walls, and the running of the tire is performed at speeds of below 80 km/h.

2. The method according to claim 1, wherein, in the second phase testing, the inserting of the puncturing objects is performed when the tire is at a temperature in a range of about 50 degrees Celsius to 60 degrees Celsius.

3. The method according to claim 1, wherein, in the first phase testing, the running of the tire is performed at a fixed speed $V_1$ in a range of 90 km/h to 120 km/h.

4. The method according to claim 1, wherein, in the second phase testing, the running of the tire is performed at a fixed speed $V_2$ in a range of 50 km/h to 75 km/h.

5. The method according to claim 1, wherein the second phase testing further includes a second running of the tire at a fixed speed $V_{2-2}$ greater than 80 km/h.

6. The method according to claim 1, further comprising a third phase testing, wherein the third phase testing includes:
   creating a plurality of punctures in the wall of the tire by inserting a plurality of puncturing objects through the wall, extracting the puncturing objects from the wall of the tire,
after the puncturing objects have been extracted, running the tire at a speed $V_3$ greater than 120 km/h over a given distance with a regulated inflation pressure,
stopping the running of the tire, and,
for each puncture, determining a pressure loss resistance index based on an estimate of a leak rate of the puncture.

7. The method according to claim 6, wherein the speed $V_3$ is fixed and is less than 180 km/h.

8. The method according to claim 1, further comprising for at least one of the first phase testing and the second phase testing, if the tire does not include any self-sealing product, placing a sealing product in an internal cavity of the tire after the running of the tire has stopped and before the pressure loss resistance indices are determined.

9. The method according to claim 1, further comprising for each of the first phase testing and the second phase testing, calculating a mean pressure loss resistance index for all the punctures.

10. The method according to claim 1, further comprising for each of the first phase testing and the second phase testing, calculating a pressure loss resistance index for all the punctures by combining scores for each puncturing object and weighting the scores using a curve that indicates a frequency at which the puncturing objects appear within a customer base.

11. The method according to claim 1, wherein, during the running of the tire, the tire is run for a distance greater than 200 km, with greater than 500 km being preferable for the distance.

12. The method according to claim 1, wherein, during the running of the tire, the tire is run on a rolling road.

13. The method according to claim 1, wherein the tire is inflated before the puncturing objects are inserted through the wall of the tire.

14. The method according to claim 1, wherein, during the running of the tire, the inflation pressure is regulated to a pressure in a range of 1.8 bar to 5 bar according to a type of the tire.

15. The method according to claim 1, wherein the puncturing objects include screws and nails of varying diameters or varying lengths or both varying diameters and varying lengths.

16. The method according to claim 1, wherein a total number of the puncturing objects is in a range of 10 to 50, with a range of 20 to 40 being preferable for the total number.

17. Method according to claim 1, wherein a diameter of at least one of the puncturing objects is in a range of 3 mm to 5 mm.

18. The method according to claim 1, wherein at least one of the puncturing objects is inserted into a crown of the tire.

19. The method according to claim 1, wherein a surfactant is used to visualize and qualitatively assess the leak rate of each puncture.

20. The method according to claim 19, where a scoring scheme is used to categorize the leak rate of each puncture, in which:
a score of 100 indicates no leak, with no visible bubble,
a score of 80 indicates a nanoleak, with very small bubbles having a diameter smaller than 0.1 mm, the very small bubbles being visible only with a magnifying glass,
a score of 60 indicates a microleak, with small bubbles having a diameter in a range between 0.1 mm and 1 mm, the small bubbles being visible to a naked eye, and
a score of 0 indicates a leak, with growing bubbles having a diameter greater than 1 mm, or with no bubble at all due to an air flow rate being too great for a bubble.

\* \* \* \* \*

UNITED STATES PATENT AND TRADEMARK OFFICE
CERTIFICATE OF CORRECTION

PATENT NO. : 9,689,779 B2
APPLICATION NO. : 14/906140
DATED : June 27, 2017
INVENTOR(S) : Christopher Careme It is certified that error appears in the above-identified patent and that said Letters Patent is hereby corrected as shown below:

In the Drawings

Sheet 1, Figure 2, "Distribution diamétres des clous Chine / US" should read --Diameter distribution of nails China / US--, "frequence cumulée %" should read --cumulative frequency--, and "diamétre clou" should read --nail diameter--; and Sheet 3, Figure 8, "Vitesse" should read --Speed--.

In the Specification

Column 1:
Line 12, "holed" should read --pierced--.

Column 7:
Line 30, "to" should be deleted.

Column 12:
Line 13, "Method" should read --The method--.

Signed and Sealed this
Seventeenth Day of October, 2017

Joseph Matal
*Performing the Functions and Duties of the
Under Secretary of Commerce for Intellectual Property and
Director of the United States Patent and Trademark Office*